United States Patent [19]  
Brose et al.

[11] 3,933,875  
[45] Jan. 20, 1976

[54] OPAQUE POLYESTER COPOLYMER COATED ARTICLES

[75] Inventors: Horst Brose; Karl Dieter Depping, both of Hiltrup; Dietrich Hentschel, Wolbeck; Bernard Kostevc, Munster; Klaus Schmidt, Hiltrup, all of Germany

[73] Assignee: BASF Farben & Fasern AG, Hamburg, Germany

[22] Filed: Mar. 1, 1973

[21] Appl. No.: 337,063

[30] Foreign Application Priority Data

| Mar. 11, 1972 | Germany | 2211899 |
| Apr. 1, 1972 | Germany | 2216052 |
| Apr. 22, 1972 | Germany | 2219847 |

[52] U.S. Cl. .............. 428/413; 260/828; 260/835; 260/843; 260/861; 260/862; 260/872; 427/44; 427/54; 428/425; 428/480
[51] Int. Cl.² .................. B32B 27/38; B32B 27/00
[58] Field of Search ..................... 117/93.31, 161 K; 204/159.15, 159.19; 427/44, 54; 428/413, 425, 480; 260/828, 835, 843, 861, 862, 850, 872

[56] References Cited
UNITED STATES PATENTS

| 3,499,781 | 3/1970 | Krueckel | 117/93.31 |
| 3,669,716 | 6/1972 | Keyl et al. | 117/93.31 |
| 3,699,022 | 10/1972 | Behrens et al. | 117/93.31 |
| 3,721,723 | 3/1973 | Heidel | 117/93.31 |
| 3,760,033 | 9/1973 | Arbuckle et al. | 204/159.15 |

*Primary Examiner*—J. H. Newsome
*Attorney, Agent, or Firm*—Gilbert L. Wells

[57] ABSTRACT

Opaque coatings and molded articles are produced from normally transparent copolymer compositions of unsaturated polyesters and monomers therefore by using from about 3 percent to less than 45 percent by weight of unsaturated polyesters based on the total weight of the composition.

5 Claims, No Drawings

3,933,875

OPAQUE POLYESTER COPOLYMER COATED ARTICLES

CROSS REFERENCES TO RELATED APPLICATIONS

Applicants claim priority under 35 U.S.C. 119 for applications U.S. Pat. Nos. 22 11 899.6; 22 16 052.7; and 22 19 837.4, filed respectively March 11, 1972; April 1, 1972 and April 22, 1972 in the Patent Office of the Federal Republic of Germany.

The disclosure of assignee's application Ser. No. 337,064 filed March 1, 1973, having the title "Cured Opaque Coatings with a High Hiding Powder Produced from Normally Transparent Polyester Paste Filler Compositions" and now abandoned is incorporated herein.

BACKGROUND OF THE INVENTION

This invention relates to opaque molded articles of polymerizable molding compositions, containing unsaturated polyesters and copolymerizable monomers, as well as conventional catalysts and additives.

The invention furthermore relates to opaque coatings of coating materials based upon unsaturated polyesters and copolymerizable monomers containing conventional catalysts and additives.

The invention relates also to a process of producing the opaque molded articles and opaque coatings.

Finally, the invention is concerned with materials having opaque, white or colored synthetic resin surfaces.

The term "coating materials" is understood to mean in this disclosure all liquid forms of preparations required for the production of coatings, laminates, varnish structures, such as fillers, primers, size varnishes, top coats, casting and molding compounds, and the like.

The term "coatings" is to mean herein all layers, coatings, laminates, or varnish coats obtained from the aforementioned coating materials.

The term "materials" is to mean in this text all materials suitable for synthetic resin coatings of wood, wood materials, pressed materials, cardboard, paper, glass, fabric, or metal. Wood materials are understood to mean finished wood products, such as fiberboards, hardboards, jointed boards with and without veneer. Pressed materials are laminated materials from papers, fabrics, fibrous fleeces, or glass mats, impregnated with synthetic resins, cured with the use of pressure and heat. Also plastics can in certain cases serve as "materials" for synthetic resin coatings. Although the materials need not have a planar shape, panels or plates are preferably provided. The term "materials" also includes those above-mentioned substances which had been subjected to a pretreatment. Thus, wood and wood materials can be stained, metals can be provided with a wash primer, a phosphate coating, or a chromate coating. Furthermore, the materials can be sized, primed, or coated with an adhesive or varnish layer.

The term "polymerizable molding compositions" includes all molding compounds technically employed based upon unsaturated polyesters and copolymerizable monomers with the use of conventional catalysts, accelerators, additives, and customary curing processes. Such polyester molding compositions have attained great significance in technology. Insofar as the production of coatings is concerned, these polyester molding compositions are called "polyester coating materials" in the following description. The voluminous literature concerned with the composition, utilization, and technology of polyester molding compositions or polyester coating materials is summarized, inter alia, in the standard works "Polyesters and Their Applications" (Bjorksten, Tovey, Harker, and Henning, Hew York, Reinhold Publishing Corporation, 1956), "Polyester Resins" (Lawrence, New York, Reinhold Publishing Corporation, 1960), and "Unsaturated Polyesters: Structure and Properties" (Boenig, Amsterdam, Elsevier Publishing Company, 1964).

The curing of polyester molding compositions and of coatings made from polyester coating materials can be effected in various ways. This process can be conducted without external heat supply at ordinary room temperatures, if the molding compositions or coating materials contain peroxides as curing agents and suitable accelerators. The curing agents and accelerators, however, must be adapted to each other.

The curing process initiated by peroxides can be further accelerated by supplying external heat or by irradiation with infrared rays, or by the use of high frequency energy.

In this manner, transparent molded articles have heretofore been obtained from transparent or translucent molding compositions. In contrast thereto, opaque molded articles have previously been produced only from pigmented molding compositions, i.e. those to which have been added hiding pigments, such as for example, titanium dioxide, carbon black, iron oxide, dyes, etc. These opaque molded articles possess a more or less high residual transparency, dependent on the content of hiding pigments.

Another way of curing polyester molding compositions and coatings prepared from polyester coating materials is irradiation with ultraviolet light. In this case, the peroxide curing agent and the accelerator can, in principle, be omitted. In place thereof a photochemically active sensitizer is employed. The latter effects, under the action of UV light, a splitting off of radicals, which initiates a polymerization of the entire polyester layer. The UV rays employed in this process are normally produced by high pressure mercury vapor lamps or low pressure mercury vapor lamps or superactinic fluorescent tubes. In place of ultraviolet light, it is also possible to employ sunlight or another, more strongly ionizing radiation, for curing purposes.

When UV light is used for curing, it has heretofore been possible to cure only transparent molding compositions to transparent molded articles or transparent coatings, in contrast to the curing process initiated by peroxides and suitable accelerators. The conventional UV curing processes are summarized in the articles "Die Lichthaertung von Polyester-Lacken" [Light Radiation Curing of Polyester Resin Varnishes] (Eugen Richter, "Moderne Holzverarbeitung" [Modern Wood Processing], Vol. 10, 1968, pp. 604–606) and "Lackhaertung durch Ultraviolettes Licht" [Varnish Curing by Ultraviolet Light], (Dr. Wolfgang Deninger and Dr. Manfred Patheiger, "Industrie-Lackier-Betrieb" [Industry Varnishing Operation], 37th year, Vol. 3, March 1969, pp. 85–91).

SUMMARY OF THE INVENTION

It is an object of the present invention to obtain, by curing, opaque, white molded articles from transparent polyester molding compositions which do not contain white pigments or other hiding pigments. The synthetic resin mixture had to be modified during the curing process so that it was converted from the transparent, glassy condition into an entirely opaque state.

Another object of this invention is the production of opaque, covering coatings by curing with UV radiation, which has heretofore been possible only in the limited area of producing transparent coatings.

It has now been found, surprisingly, that opaque, white or colored molded articles are obtained from polymerizable molding compositions containing unsaturated polyesters and copolymerizable monomers, as well as conventional catalysts and additives, in accordance with a process characterized in that transparent molding compositions are cured, the proportion of which is about 3 percent to less than 45 percent by weight in unsaturated polyesters, namely 3 to 45 percent by weight and preferably 10 to 45 percent by weight.

In this connection, all conventional curing processes can be employed. Thus, the curing step is accomplished, for example, in a conventional manner by the effect of infrared radiation or by supplying external heat or by high frequency energy. With the choice of suitable peroxides and accelerators, the same effect can also be obtained without external heat supply.

The second object of the invention is surprisingly attained by employing a process for the production of opaque coatings having high hiding power from coating materials based upon unsaturated polyesters and copolymerizable monomers containing conventional catalysts and additives, where the process is characterized in that coatings from radiation permeable coating materials, having the proportion of unsaturated polyester from about 3 percent to less than 45 percent, and preferably about 10 – 45 percent, based on the weight of the radiation permeable coating material, are cured with UV light or ionizing radiation. Furthermore, at the same time, the proportion of unsaturated polyesters in the mixture of polyester, monomers, and optionally other solvents, is likewise from about 3 percent to less than 50 percent by weight.

The surprising effect of producing opaque molded articles from transparent molding compositions during curing also occurs when part of the monomers is replaced by unreactive solvents, such as aliphatic and/or aromatic hydrocarbons (gasoline, hexane, toluene, xylene), alcohols, glycols, esters. Up to 30 percent of the copolymerizable monomers can be replaced. Although this reduces the proportion of monomers, the ratio of unsaturated polyester to the sum of monomers and solvents remains unchanged.

DESCRIPTION OF THE PREFERRED EMBODIMENTS

A further advantage of the process of this invention resides in that the liquid polyester molding compositions or coating materials can additionally contain coloring agents which impart any desired color hues to the cured, opaque molded article. The coloring agents are normally soluble in the molding composition in a transparent manner.

Another advantage of the present invention resides in widening the field of design possibilities for the materials and producing, for example, panels having novel surface characteristics and applications, which contain opaque, white or colored surfaces of a synthetic resin layer, but do not contain any hiding pigments.

The additional problem of providing materials having an opaque, white or colored surface of a synthetic resin layer was solved by providing that the material is coated with a synthetic resin layer which contains no hiding pigments, and that this synthetic resin layer forms a surface having high hiding power which extensively reflects impinging light rays and exhibits only a minimum light absorption. This is accomplished by having the synthetic resin layer consisting of unsaturated polyesters and copolymerized monomers in the stated proportions. In order to obtain particularly advantageous opaque surfaces, the material is furthermore characterized in that the synthetic resin layer of unsaturated polyesters and monomers polymerized therein consists of a coating cured from coating materials which contain no hiding pigments and wherein the proportion of unsaturated polyesters is from about 3 percent to less than 45 percent, based on the weight of the liquid coating material, and furthermore from about 3 percent to less than 50 percent by weight of the sum of the weights of the unsaturated polyester, the copolymerizable monomers and optionally other solvents.

Further advantageous embodiments of the invention are obtained by providing that the synthetic resin layer contains additionally noncovering fillers and/or furthermore additionally paraffin and/or wax. Other advantageous embodiments of the invention, by means of which the technological surface properties can be varied, are realized by providing that the synthetic resin layer additionally contains other synthetic resins different from the unsaturated polyesters and compatible with the polymerized synthetic resin layer.

Another advantageous embodiment of the invention resides in that an additional adhesive layer is arranged between the material and the synthetic resin layer.

A special advantage of the opaque surface of the materials coated with a synthetic resin layer according to this invention resides in that the synthetic resin layer does not contain any hiding pigments, but rather the synthetic resin layer is inherently opaque. In this manner, a considerable enrichment of the art is achieved, since such materials open up novel design possibilities and decorative effects.

The molded articles or coatings produced according to the process of the present invention are opaque and white, although they were obtained from transparent molding compositions or coating materials which do not contain any hiding pigments. This was surprising and unforeseeable. In the uncured condition, the molding compositions or coating materials are transparent. They become white and opaque during curing. If the molding composition or the coating material dyed with transparent, in most cases soluble dyes, the opaque molded article or coating is not white, but rather exhibits any desired color hue obtainable by mixing with white.

Examples for suitable transparent coloring dyes are:
a. metal complex dyestuffs, e.g. helio fast yellow 12 G (Bayer AG, Leverkusen), pigment green G (BASF AG, Ludwigshafen), helio fast carmin B (Bayer AG, Leverkusen),
b. diazo dyes, e.g. chrom fast yellow 2 b (Ciba, Basel), chrom fast red 2 R (Ciba),
c. Dioxazin dyes, e.g. PV fast violett Bl (Hoechst),
d. indanthren dyes, e.g. indanthren violett RH (BASF), PV fast orange GRL (Hoechst).

Generally all transparent synthetic dyestuffs alone or in combination can be used. The quantity depends on the desired color tone and lies between 0.001 and 1 percent by weight, preferably between 0.02 and 0.3 percent, relating to the total weight of unsaturated polyester and copolymerizable monomers.

The surprising effect that, only by curing, opaque molded aritlces or coatings are produced from transparent molding compositions or transparent coating materials, which products exhibit a white color, is achieved by the fact that the ratio of unsaturated polyester to the remaining liquid components, especially the copolymerizable monomers, is shifted so that the proportion of the unsaturated polyester in the liquid molding composition or the liquid coating material is reduced to from about 3 percent to less than 50 percent by weight, and that furthermore the proportion of the polyester in the mixture of unsaturated polyester, monomers, and optionally other solvents, amounts to from about 3 percent to less than 50 percent by weight. If the polyester proportion is higher, the cured molded articles and coatings are transparent.

The production of opaque molded articles or coatings by curing is not bound to specific unsaturated types of polyesters. It has been found that all unsaturated polyesters in practical use, of which there are a multitude, are suitable. Detailed data regarding the composition and manufacture of unsaturated polyesters are contained in the literature references cited in the foregoing. As is known, unsaturated polyesters are understood to be condensation products obtained by the esterification of unsaturated dicarboxylic acids, such as fumaric acid, maleic acid, maleic anhydride, or mixtures thereof, with polyhydric, particularly dihydric alcohols, e.g. propylene glycol, ethylene glycol, diethylene glycol, furthermore hexanediol (glycerol), trimethylolpropane, and pentaerythritol. A portion of the unsaturated dicarboxylic acids can be replaced by saturated polycarboxylic acids, such as succinic acid, adipic acid, sebacic acid, o-phthalic acid, o-phthalic anhydride, isophthalic acid, terephthalic acid.

Also the copolymerizable monomers disclosed in the abovecited literature references are usable. These are the conventionally employed monomers which are used individually or in a mixture with one another. Examples in this connection are styrene, vinyltoluene, acrylic acid esters, methacrylic acid esters, such as methyl methacrylate, methyl acrylate, ethyl acrylate, ethyl methacrylate, furthermore divinylbenzene and diallylphthalate.

The best results with respect to appearance and structure of the white molded articles or coatings are obtained by irradiating the molding compositions or coatings with UV light. The preferred ratio between monomers and unsaturated polyester varies, depending on the type of monomer and polyester, and preferably is between 10 and 45 percent by weight of unsaturated polyester in the unpigmented coating material or molding composition.

Thus, for example, the hardness, scratch resistance, dimensional stability, heat resistance and flammability can be affected by the addition of suitable fillers, additives, or other auxiliary agents. For example, it is possible to add fillers of any desired particle size, such as calcium carbonate, mica, talc, quartz powder, rock powder, glass powder, barium sulfate, finely divided silicic acid, and silicic acid aerogels, finely divided metallic oxides, metallic powders, and fibrous reinforcing materials of glass, textile material and asbestos.

Suitable additives are the customary defrothers, flow agents (silicone oils), thickeners, and paraffins or waxes.

The molding composition or the coating material can additionally contain other synthetic resins different from the unsaturated polyesters and compatible with the molding composition or the coating material, such as for example, nitrocellulose, cellulose acetobutyrates, alkyd resins, ketone resins, saturated polyesters, polymer plasticizers (poly-adipates, poly-alkylene adipates), epoxy resins, polyurethane resins, amine aldehyde resins, urea formaldehyde resins, melamine aldehyde resins and other triazine resins, phenolic resins, acrylate and/or methacrylate resins, homopolymers and copolymers of vinyl chloride, vinyl acetate, vinyl propionate and other vinyl compounds, polyolefines. Said other synthetic resins can be used additionally in quantities up to 15 percent, preferably 0.1 to 5 percent by weight, related to the weight of unsaturated polyesters.

In the simplest case, the molding composition or the coating material consists of a solution of unsaturated polyesters in the copolymerizable monomers. This mixture is mixed, depending on the type of curing employed, either with peroxide and a cobalt compound, or with peroxide and a tertiary amine, or with a photosensitizer. Other additional activators can likewise be contained therein.

If the curing is to be effected without supplying external heat at ordinary room temperatures, the polyester molding compositions or polyester coating materials are mixed in a conventional manner with peroxides as the curing agents and with suitable accelerators, such as cobalt octoate or a tertiary amine. The peroxide and accelerators employed must, however, be adapted to each other.

Suitable peroxides are the conventionally employed organic peroxides, such as the hydroperoxides of cyclohexanone, of methyl ethyl ketone of methyl isobutyl ketone, and of cumene, furthermore, benzoyl peroxide, tert.-butyl perisononanate, 2,5-dimethylhexane 2,5-dihydroperoxide, tert.-butyl hydroperoxide, di-tert.-butyl peroxide, tert.-butyl cumyl peroxide and tert.-butyl peroctoate.

Those polyester molding compositions or coating materials mixed with peroxides are also utilized when the curing is to be effected by higher temperatures or by the effect of infrared rays or by the effect of high frequency energy.

Polyester molding compositions and coating materials to be cured under the action of ultraviolet light or sunlight contain as the curing catalysts photosensitizers. Suitable photosensitizers are, in addition to benzoin, also the derivatives thereof, such as for example, benzoin methyl ether, benzoin ethyl ether, benzoin isopropyl ether, benzoin acetate, α-benzylbenzoin, α-methylbenzoin. Other suitable photosensitizers pertain to the group of the disulfides. Additional photosensitizers are benzil, acetophenone, anthraquinone derivatives, benzophenone, phenanthrenequinone, diacetyl, tetramethylthiuram disulfide, naphthalene sulfochloride, bromotrichloromethane, bromoform, manganese carbonyl, hexaaryl imidazoles. Quite generally, all substances usually employed as photosensitizers are suitable for the curing process.

The time required for the complete curing of the molded article or the coating depends on the polymerization activity of the resin, the monomers, as well as the composition and quantity of the curing catalysts. The curing at room or higher temperatures or by means of ultraviolet radiation takes place flawlessly, so that molded articles, molded components, or coatings are obtained having good mechanical properties. As the light sources emitting UV radiation, high pressure mercury vapor lamps, low pressure mercury vapor lamps, or superactinic fluorescent tubes are normally employed.

Flameproof molded articles and coatings are obtained with the concomitant use of mono- or dichlorostyrene or of other halogen containing monomers, such as the diallyl ester of tetrachlorophthalic acid, or of vinyl ethers of brominated monovalent phenols, such as the dibromo-, tribromo-, tetrabromo-, or pentabromophenyl vinyl ether, as the copolymerizable monomer and/or with the concomitant use of halogen-containing dicarboxylic acids and/or halogen-containing hydroxyl compounds as the esterification components during the production of unsaturated polyester. Suitable halogen-containing dicarboxylic acids are, for example, hexachloroendomethylenetetrahydrophthalic acid, tetrachlorophthalic acid, dibromoisophthalic acid and 4,5-dibromohexahydrophthalic acid. Examples for suitable halogen-containing hydroxyl compounds are; glycerin monopentachlorophenyl ether, octachlorodiphenylene hydroxydialkanols, and diols containing halomethyl groups, such as pentaerythritol dichlorohydrin.

Far simpler than the method of concomitant esterification of halogen-containing components is the process of admixing a flame-proofing agent subsequently to a non-flameproof polyester molding composition or coating material. In this connection, chlorinated paraffins can be used, optionally in combination with antimony trioxide. It is also possible to admix organic antimony, silison, boron, or phosphrous compounds soluble in the molding composition or the coating material.

The polyester molding compositions proposed in accordance with this invention can also be used for the production of laminated materials, especially glass-fiber-reinforced laminated materials. The procedure is such that fibrous materials, fabrics, paper webs and cellulose fleeces or glass fiber mats are impregnated with the transparent molding compositions, wherein the proportion of unsaturated polyesters is from about 3 percent to less than 45 percent by weight, and the product is thereafter cured in a conventional manner.

The molded articles are produced by curing the polyester molding compositions in suitable molds. In this procedure, the liquid molding compositions can either be introduced directly into the mold, or they can be cured outside of the mold. In the last-mentioned case, the cured, comminuted resin is introduced into the casting mold and the cavities present therein are filled by a liquid mixture of the same molding composition, and then the product is cured as usual. It is likewise possible to employ the mixture of the liquid molding compositions together with high percentage solutions of polymers, such as polystyrene, polyvinyl ether, polyisobutylene, etc., in suitable monomers. Quite generally, it is possible to add to the molding compositions substances which afford protection against light, heat, or combustion, etc.

In the production of coatings, differences in the surface and in the coating also result, which depend on the selection of the curing agent.

It has been found that the surface of the cured coatings can be varied. The film can have the appearance of a primer, depending on the type of polyester and solvent and on the ratio between polyester and solvent. However, with the choice of suitable additives, such as, e.g. paraffin and waxes, the film can also exhibit a finished varnish effect. The surface can furthermore be brought to a high gloss by polishing and buffing. The great variety of different surface characteristics of the white coating is also achieved by a suitable selection of organic, unreactive solvents, which can replace up to 30 percent of the monomers in the coating material.

The properties of the coatings with respect to, for example, hardness, scratch resistance and adhesive strength, can be varied by the addition of suitable fillers and additives. Thus, suitable fillers are, for example, calcium carbonate, mica, silicic acid, silicon dioxide, barium sulfate, finely divided silicic acid, talc, and silicic acid aerogels, dolomite, kaolin, quartz powder, glass powder, and fibrous microsubstrates of asbestos, glass fibers, textile fibers, synthetic resin fibers. Generally fillers of which the refractive index does not exceed 1.70 can be used.

The coatings thus obtained are normally white, with the absence of soluble coloring agents, and possess an excellent hiding power which can be compared with those films and coatings obtained from highly pigmented coating materials. The coatings of the invention do not differ from the latter with respect to appearance and properties, although they do not contain hiding pigments.

The coating materials can be applied to wood, wood materials, synthetic resins, glass, cardboard, paper, and metal by means of the customary application methods of pouring, spraying, or rolling. The materials to be coated can optionally be pretreated, or they can exhibit a varnish or primer coat.

The methods of application can vary. Thus, it is possible on the one hand, to admix the catalysts or photosensitizers directly with the coating compound. On the other hand, the peroxide can first be applied to the article to be coated in the form of a curing primer. Thereafter, the polyester material, which is free of peroxide but contains accelerators, is applied to the peroxide-containing base coat. It is also possible to apply the component containing the curing agent together with the component containing the accelerator in a wet-on-wet manner.

The layer thickness of the coatings can vary within wide limits. Of course, the hiding power of the opaque coatings is also lessened when the layer thickness is small. However, covering layers having high hiding power with a thickness of the dry film of 10 microns can still be obtained. In general, the layer thicknesses of polyester coats are larger and amount to up to 1.5 – 2 cm. The preferred layer thicknesses range between about 50 and 700 microns.

The following examples serve to explain the invention, but are not limitative of same. The parts set forth therein are parts by weight and the percentages are percent by weight.

EXAMPLE 1.

A. For the production of opaque molded articles, an unsaturated polyester is produced in a conventional manner from:

| 26 parts | 1,2-propylene glycol |
| 16 parts | maleic anhydride |
| 20 parts | phthalic anhydride |

To this mixture is added

| 0.003 part | hydroquinone | as the stabilizer. The esterifaction procedure is finished when the resulting unsaturated polyester resin reaches an acid number of 35. To this resin is added styrene until the solids content is 70 percent by weight.

B. A molding composition composed of:
500 parts of the polyester solution obtained according to 1 A,
500 parts styrene,
10 parts of a cobalt naphthenate solution in toluene having a content of 4 percent of metallic cobalt,
10 parts of a curing paste of equal parts of benzoyl peroxide and a dibutyl phthalate,
3 parts of a 10 percent paraffin solution in toluene, is poured into a casting mold (300 × 50 × 30 mm³). The molded article thus produced can be removed from the mold after 1½ and is of uniformly white opacity.

EXAMPLE 2.

The molding composition according to Example 1 B is mixed with 0.5 part of helio fast yellow 12 G (Bayer AG, Leverkusen/Germany). After curing, a yellow molded article is obtained which is likewise opaque.

EXAMPLE 3.

A. An unsaturated polyester is produced in a conventional manner from:

| 130 parts | 1,6-hexandiol |
| 98 parts | maleic anhydride |

To this mixture is added as stabilizer

| 0.03 parts | hydroquinone |

The esterification procedure is finished, when the resulting unsaturated polyester resin reaches an acid number of 20. To this resin is added styrene at temperatures of between 90° and 95°C until the solids content is 70 percent by weight.

B. A molding composition composed of:
360 parts of the polyester solution obtained according to 3 A,
350 parts styrene,
100 parts vinyltoluene,
150 parts polyadipate,
1.5 parts silicic acid aerogel ("Aerosil" of the Degussa Company),
1.5 parts benzoin isopropyl ether
is poured, with the aid of an applicator machine, on a glass plate in a layer thickness of 3–4 mm. Thereafter, the coating is irradiated for 4 minutes with a high pressure mercury vapor lamp (HT Q7 of Philips). A white plate is produced as the molded article, which can be lifted off the glass plate and is completely opaque and has a surface which does not feel tacky when handled.

EXAMPLE 4.

A. An unsaturated polyester is produced in a conventional manner from:

| 65.5 parts | ethylene glycol |
| 57.0 parts | maleic anhydride |
| 35.5 parts | phthalic anhydride |
| 35.0 parts | adipic acid |
| 0.35 parts | hydroquinone |

The esterification procedure is finished, when the resulting unsaturated polyester resin reaches an acid number of 30. To this resin is added styrene at temperatures of between 90° and 95°C until the solids content is 70 percent by weight.

B. A molding composition composed of:
400 parts of the polyester solution obtained according to 4 A,
600 parts styrene,
10 parts finely particulate silicic acid,
250 parts barium sulfate, precipitated,
10 parts of a curing agent paste consisting of equal parts of benzoyl peroxide and dibutyl phthalate,
10 parts cobalt naphthenate (50 percent in styrene),
3 parts paraffin solution (10 percent strength) in toluene,
is heated in a round glass flask for 15 minutes to 100°C. A cured, white, opaque molded article is thus obtained.

EXAMPLE 5.

A. A polyester with an acid number of 35 is produced, by heating to 150° – 180°C and under a protective gas, from:
1160 parts fumaric acid,
1480 parts phthalic anhydride
1630 parts 1,2-propylene glycol
0.75 part hydroquinone.

B. A mixture of:
100 parts of the polyester obtained according to Example 5 A,
70 parts styrene and
50 parts 2,4,6-tribromophenyl allyl ether,
10 parts toluene,
3 parts of a 10 percent cobalt naphthenate solution in styrene,
is mixed with:
6 parts of a cyclohexanone peroxide solution (1 : 1).

Three glass fiber mats are impregnated with the mixture, and these plates are placed on top of one another and rolled between cellophane paper to a panel having a thickness of 3 mm. After curing at room temperature for about one hour, the panels are post-cured for 2 hours at 80°C. A white laminated panel is thus obtained having flame-retardant properties.

EXAMPLE 6.

A coating composition is produced from the following components:
40 parts of the polyester solution obtained according to Example 1 A,
60 parts styrene,
1 part benzoin isopropyl ether.

Of this coating material, 654 g/m² is poured with the aid of an applicator machine on a fiberboard panel having a raised edge. Thereafter, the coating is preliminarily gelled for 3 minutes by means of a low pressure mercury vapor lamp and thereafter finally cured for 1 minute with a high pressure mercury vapor lamp (HT Q 7 of Philip). A white coating results, which is opaque and can be polished and thereafter has the appearance of a pigmented varnish coat.

EXAMPLE 7.

A coating material is produced from the following components:
- 40 parts of the polyester solution obtained according to Example 3 A,
- 60 parts styrene,
- 1.5 parts silicic acid aerogel ("Aerosil" of the Degussa Company),
- 1.5 parts benzoin methyl ether.

Of this coating material, 534 g/m² is poured on a fiberboard panel with the aid of an applicator machine. Thereafter, the coating is cured as described in Example 6. The product is likewise a white, opaque coating.

EXAMPLE 8.

A coaating material is produced from the following components:
- 42.5 parts of the polyester solution obtained according to Example 4 A,
- 10 parts toluene,
- 52 parts styrene,
- 5 parts of a 5 percent paraffin solution in styrene (m.p. of the paraffin 60°C),
- 1 part methylbenzoin methyl ether,
- 1.5 parts silicic acid aerogel Of this coating material, 775 g/m² is poured on a fiberboard panel with the aid of an applicator machine. The curing is effected as disclosed in Example 6, thus obtaining a white, opaque coating.

EXAMPLE 9.

A coating material is produced from the following components:
- 40 parts of the polyester solution obtained according to Example 4 A,
- 50 parts styrene,
- 10 parts butyl methacrylate,
- 2 parts silicic acid aerogel,
- 4.5 parts of a 5 percent paraffin solution in styrene (m.p. : 60°C),
- 1 part benzoin isopropyl ether.

Of this coating composition, 1800 g/m² is poured on a fiberboard panel. Curing is accomplished according to Example 6. A white coating results, which is opaque.

EXAMPLE 10.

A coating material is produced from the following components:
- 40 parts of the polyester solution obtained according to Example 1 A,
- 60 parts styrene,
- 1 part finely divided silicic acid,
- 25 parts calcium carbonate, precipitated,
- 1 part methylolbenzoin methyl ether.

Of this coating material, 650 g/m² is poured on a fiberboard panel by means of an applicator machine. Curing again takes place as described in Example 6. The result is a white, opaque coating.

EXAMPLE 11.

A coating material is produced from the following components:
- 50 parts of the polyester solution obtained according to Example 3 A,
- 50 parts vinyltoluene,
- 2 parts of a 25 percent nitrocellulose solution in ethyl acetate,
- 3 parts of a 5 percent paraffin solution in styrene (m.p. of the paraffin : 60°C),
- 2 parts naphthalene-2-sulfochloride.

Of this coating composition, 800 g/m² is poured on a hardboard panel. Thereafter, the coating is gelled preliminarily for 2½ minutes by means of a low pressure mercury vapor lamp and is then cured for one minute by means of a high pressure mercury vapor lamp. The result is a white coating which is opaque.

EXAMPLE 12.

The coating material according to Example 11 is mixed with 0.05 part of PV fast green G (BASF AG, Lugwigshafen, Germany). After curing, a green coating is produced which is likewise opaque.

EXAMPLE 13.

A coating material is produced from the following components:
- 57 parts of the polyester solution obtained according to Example 1 A,
- 42 parts styrene,
- 5 parts of a 5 percent paraffin solution in styrene (m.p. of the paraffin : 60°C),
- 1 part of a cobalt naphthenate solution in toluene with 4 percent metallic cobalt content,
- 2 parts cyclohexanone peroxide.

Of this coating material, 1500 g/m² is poured on a fiberboard panel having a raised edge by means of an applicator machine. In this way, several samples are produced which are cured according to different methods.

a. After standing overnight, the coating is completely cured and of white opacity.

b. Drying is effected with the aid of a jet dryer blowing hot air of about 140°C onto the surface. The jet drying is effected after the coating is preliminarily gelled. The surface is treated with the jet dryer for about 1½ to 2 minutes. Thereafter, the coating is completely cured and opaquely white.

c. The coating is irradiated with infrared radiation stemming from an infrored dark radiator, the latter having a distance of about 25 cm. from the coated panel. After about 1½ minutes, the coating is completely cured and of white opacity.

d. The coating is cured in an inductive high frequency field within 100 seconds. Again, a white, opaque coating is the result.

We claim:

1. In a process for the production of opaque coated articles comprising applying and conventionally curing on the surface of said articles normally transparent coating compositions containing unsaturated polyesters (I), copolymerizable monomers (II), catalysts and additives, the improvement comprising: said coating composition containing said unsaturated polyester (I) and said copolymerizable monomers (II) in a relationship of about 3 —45 weight percent (I) and about 55–97 weight percent (II), and additionally 0.1 to 15 weight percent related to the content of unsaturated polyesters of synthetic resins selected from the group consisting of nitrocellulose, cellulose-acetobutyrate, alkyd resins, ketone resins, saturated polyester resins, poly-adipates, epoxide resins, polyurethane resins, amine-aldehyde resins, phenolic resins, acrylic resins, methacrylic resins, vinylchloride polymers, vinylacetate polymers and vinylpropionate polymers.

2. The process of claim 1, wherein said relationship between I and II is about 10 – 45 percent by weight (I) to 55 – 90 percent by weight (II).

3. In the process of claim 1, wherein said additional content of synthetic resins is about 0.1 to 5 percent by weight related to the content of the unsaturated polyesters.

4. The coated article produced by the method of claim 1.

5. The process of claim 1, further comprising about 0.001 to 1 percent by weight transparent coloring dyestuffs selected from the group consisting of metal complex dyestuffs, diazo dyestuffs, dioxazine dyestuffs and indanthrene dyestuffs.

* * * * *